United States Patent
Sidorov et al.

(10) Patent No.: US 11,610,693 B2
(45) Date of Patent: Mar. 21, 2023

(54) REACTOR MOLTEN CORE LOCALIZATION DEVICE

(71) Applicants: Joint-stock company "Atomenergoproekt", Moscow (RU); Joint Stock Company "Science and Innovations", Moscow (RU)

(72) Inventors: Aleksandr Stalevich Sidorov, Moscow (RU); Tatyana Yaropolkovna Dzbanovskaya, Moscow (RU); Mihail Aleksandrovich Roshchin, Moscow (RU)

(73) Assignees: JOINT-STOCK COMPANY "ATOMENERGOPROEKT", Moscow (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/627,744

(22) PCT Filed: Dec. 28, 2018

(86) PCT No.: PCT/RU2018/000898
§ 371 (c)(1),
(2) Date: Dec. 30, 2019

(87) PCT Pub. No.: WO2020/067919
PCT Pub. Date: Apr. 2, 2020

(65) Prior Publication Data
US 2021/0296013 A1 Sep. 23, 2021

(30) Foreign Application Priority Data
Sep. 25, 2018 (RU) .......................... RU2018133761

(51) Int. Cl.
*G21C 9/016* (2006.01)

(52) U.S. Cl.
CPC ................... *G21C 9/016* (2013.01)

(58) Field of Classification Search
CPC .............. G21C 9/016; G21C 13/024
See application file for complete search history.

(56) References Cited

U.S. PATENT DOCUMENTS 3,152,713 A * 10/1964 Clifford ................. G21C 13/02
976/DIG. 167
4,949,363 A * 8/1990 Tupper ................. G21C 13/024
376/260

FOREIGN PATENT DOCUMENTS

| FR | 2868867 A1 | * 10/2005 | ............ F16F 9/3264 |
| GB | 881790 A | * 11/1961 | ............ G21C 13/024 |
| GB | 2236210 A | * 3/1991 | ............ G21C 9/016 |

* cited by examiner

*Primary Examiner* — Sharon M Davis
(74) *Attorney, Agent, or Firm* — J. Miguel Hernandez; James R. Gourley; Carstens, Allen & Gourley, LLP

(57) ABSTRACT

The invention relates to the field of nuclear energy, in particular, to systems that ensure the safety of nuclear power plants (NPPs), and can be used in severe accidents resulting in molten core, destruction of the reactor vessel and molten metal output into the containment volume of NPP.

The technical result of the claimed invention is to increase the reliability of the reactor molten core localization device. The technical result of reactor molten core localization device is achieved due to the lower support consisting of radial supports of a horizontal embedded slab and radial supports installed in the lower part of the molten metal trap casing joined together by clamps, while the radial supports and the fasteners have oval shaped openings.

4 Claims, 1 Drawing Sheet

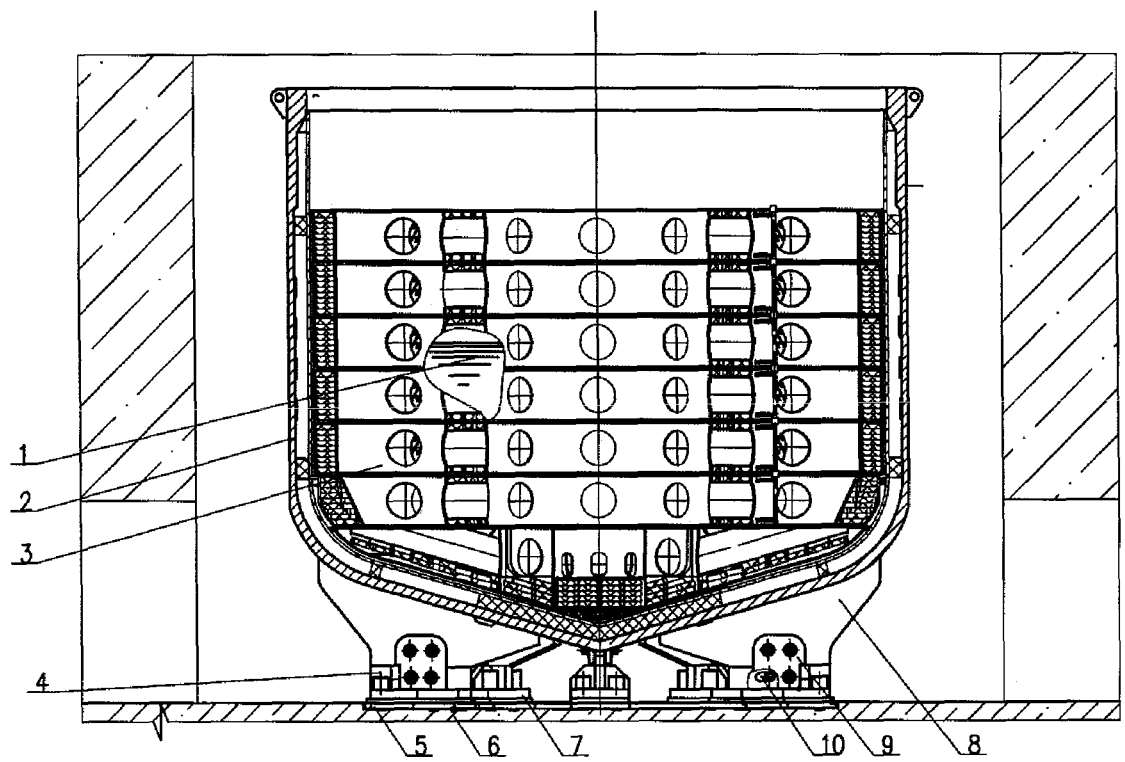

REACTOR MOLTEN CORE LOCALIZATION DEVICE

CROSS-REFERENCE TO RELATED APPLICATIONS

This application is a US 371 application from PCT/RU2018/000898 filed Dec. 28, 2018, which claims priority to Russian Application No. 2018133761 filed Sep. 25, 2018, the technical disclosures of which are hereby incorporated herein by reference.

The invention relates to the field of nuclear energy, in particular, to systems that ensure the safety of nuclear power plants (NPPs), and can be used in severe accidents resulting in molten core, destruction of the reactor vessel and molten metal output into the containment volume of NPP.

The highest radiation hazard is accidents with molten core, which can occur with various combinations of failures (equipment components break) of active and passive safety systems and normal operation systems, either under NPP complete blackout conditions and failure to supply power within the time period set by the NPP design to ensure emergency core cooling.

In such accidents, the molten core—corium, flows out of the reactor vessel melting it and the internal reactor structures, and, due to the residual heat in it, can break the integrity of the NPP reactor containment—the last barrier on the radioactive products way out into the environment.

To avoid this it is necessary to localize the corium leaked from the reactor vessel and ensure its continuous cooling, up to the complete crystallization of all corium components. This function is performed by the reactor molten core localization system, which prevents damage to the NPP containment and, thus, protects the population and the environment from radiation exposure during severe accidents of nuclear reactors.

Reactor molten core localization device [1], containing a molten metal trap installed under the bottom of the reactor vessel and provided with a cooled shell in the shape of a multiwall vessel, a filler for diluting the molten metal placed in the mentioned multiwall vessel, the lower support, consisting of a horizontal sectional, continuous or a split, embedded slab installed under a multiwall vessel in the concrete of the reactor cavity, a vertical cylindrical pipe connecting the molten metal trap to the embedded slab by means of clamps, and fasteners is known.

The disadvantages of this device is that when the molten metal moves in the trap, free temperature radial expansion of its bottom is not ensured, as well as the integrity of the bottom of the molten metal trap and the embedded slab in the reactor cavity floor during axial thermal expansions of the bottom of the molten metal trap and during impacts, which is due to structural features of the molten metal trap fastening to the lower support using a vertical cylindrical pipe.

Namely, when the molten metal enters the bottom of the trap, the inner surface of the trap is heated to a temperature close to the melting temperature of steel, which is about fifteen hundreds degrees Celsius. Although the thickness of the bottom of the trap is no less than 30% thicker than its side walls, this still results in critical thermal stresses between the bottom of the trap expanding in the radial direction and the relatively cold vertical cylindrical pipe expanding of which in the radial direction occurs only under the mechanical loading from the bottom of the trap. A vertical cylindrical pipe starts to deform unevenly, both in the azimuthal and in the radial directions, which as a result leads to the cracks initiation in it with subsequent destruction. The destruction of the vertical cylindrical pipe leads to the termination of the design functioning of the molten metal trap.

The technical result of the claimed invention is to increase the reliability of the reactor molten core localization device.

The objects to which the claimed invention is directed are to eliminate the above drawbacks.

The objects stated are solved due to the fact that in the reactor molten core localization device containing a molten metal trap installed under the bottom of the reactor vessel and provided with a cooled shell in the shape of a multiwall vessel, a filler for diluting the molten metal placed in the mentioned multiwall vessel, the lower support, consisting of a horizontal sectional, continuous or split, embedded slab installed under a multiwall vessel in the concrete of the reactor cavity, according to the invention, a horizontal sectional, continuous or split embedded slab contains radial supports, the trap also contains radial supports, resting on the radial supports of a horizontal sectional, continuous or split embedded slab, radial support of a horizontal sectional, continuous or split embedded slab and radial supports of the trap are joined by means of clamps, while the radial supports and clamps have oval-shaped holes.

A distinctive feature of the claimed invention is the lower support, consisting of a horizontal sectional, continuous or split, embedded slab having radial supports, and radial supports installed in the lower part of the molten metal trap, while the radial supports of the embedded slab and the trap are joined by means of clamps. Radial supports of the embedded slab, molten metal trap, as well as clamps have oval-shaped holes.

This allows, when heating the bottom of the molten metal trap and its radial supports, providing free radial thermal expansion of the bottom of the trap together with its radial supports due to the slip of the radial supports of the trap along the radial supports of the embedded slab, while maintaining a strong mechanical azimuthal and axial joint between the radial supports of the lower embedded slab and the trap due to a change in the position of the clamps in the oval-shaped holes of the radial supports of the embedded slab and the trap (by changing the position backlash areas in the oval-shaped holes). This eliminates the risk of the molten metal trap and lower embedded slab being shaped with loss of their efficiency and the risk of cracks initiation in the bottom of the molten metal trap and in the floor of the reactor cavity, in which the molten metal trap can be destroyed.

Under axial thermal and mechanical deformations of the molten metal trap and in the case of an impact, the integrity of the bottom and the embedded slab in the floor of the reactor cavity is achieved by load redistribution between all the radial supports of the trap and the lower embedded slab. In this case, one part of the radial supports will work in sliding and tension, and the other part—in compression and shear. In the case of impact load on the molten metal trap, oscillations of its bottom occur, in which all the radial supports and clamps work alternately in tension and compression in the area of elastic deformation, up to the attenuation of the oscillatory process.

FIG. 1 shows a reactor molten core localization device made in accordance with the claimed invention.

The claimed invention operates as follows.

FIG. 1 shows a reactor molten core localization device, containing a molten metal (1) trap (2) installed under the bottom of the reactor vessel and provided with a cooled shell in the shape of a multiwall vessel, a filler (3) for diluting the molten metal (1) placed in the mentioned multiwall vessel, the lower support (4), consisting of a horizontal sectional, continuous or a split, embedded slab (5) installed under a multiwall vessel in the concrete of the reactor cavity (6), having radial supports (7). The radial supports (8) are made on the outside of the lower part of the trap (2) of the molten metal (1), which are supported by radial supports (7) of a horizontal embedded slab (5). The radial supports (7) of the horizontal embedded slab (5) and the radial supports (8) of the molten metal (1) trap (2) are joined by means of clamps (9), each of the radial supports (8) of the molten metal (1) trap (2) and horizontal embedded slab (5), as well as the fastener (9) have oval-shaped openings (10).

At the moment of the reactor vessel break, the mocore melt (1) under the hydrostatic pressure and overpressure begins to enter the trap (2) and comes into contact with the filler (3).

The molten metal (1) mainly accumulated in the central part of the bottom of the molten metal (1) trap (2). The molten metal temperature is approx. 2500° C., which leads to the expansion of both the molten metal (1) trap (2) and the radial supports (7), (8). However, the availability of radial supports (8) in the lower part of the molten metal (1) trap (2) and radial supports (7) at the horizontal embedded slab (5) joined together by means of clamps (9) with oval-shaped openings (10), allows maintaining the integrity of the bottom of the molten metal trap, horizontal embedded slab (5) in the floor of the reactor cavity (6) under non-uniform axial thermal expansions of the molten metal trap due to the sliding clamps (9) in the oval-shaped openings (10) of the radial supports in the axial (vertical) planes that is provided by small mechanical axial backlash of fasteners (9) located in oval-shaped openings (10).

With non-axisymmetric discharge inflow of the molten metal (1), for example, of 60 tons of superheated steel during 30 s, the main shock and thermal loads are on the side inner wall of the molten metal (1) trap (2).

In this case, first, due to the elastic deformations of the bottom of the molten metal trap, the load is redistributed between the radial supports (7) of the lower embedded slab and the radial supports (8) of the molten metal trap. One part of the mechanical shock is absorbed by the elastic vibrations of the bottom of the molten metal trap, the other part is absorbed by the elastic vibrations of the radial supports (7), (8), and part is damped by the fastenings of the molten metal trap to the lower support due to the location of the fasteners in the oval-shaped openings (10) of the radial supports (7), (8) and structural backlash of fasteners in these supports.

Further, the subsequent heating of the bottom of the molten metal (1) trap (2) is accompanied by its radial and axial expansion, in which the radial supports (8) of the molten metal trap do not mechanically resist its radial expansion and the increase of its azimuthal dimensions. Positions change of the radial supports (8) of the trap (2) is ensured by slipping along the radial supports (7) of the horizontal embedded slab (6) installed in the floor of the reactor cavity. This allows for the unloading of the molten metal trap of additional thermal and mechanical loads caused by mechanical and thermal effects of the molten core on the molten metal trap.

The lower support made it possible to increase the reliability of the reactor molten core device localization device due to free radial thermal expansions of the bottom of the molten metal trap.

REFERENCES

1. RF Patent No. 2398294, IPC G21C 9/00, priority dated 15 Apr. 2009.

The invention claimed is:

1. A reactor molten core localization device comprising:
a cylindrical reactor shaft having at least one side concrete surface and a bottom concrete surface;
a reactor vessel installed in the reactor shaft;
a core catcher located in the reactor shaft and under the reactor vessel, the core catcher comprising a plurality of walls and core catcher supporting elements having oval holes located on a bottom surface of the core catcher and disposed radially with respect to a central vertical axis of the reactor shaft;
a sacrificial bed configured to dilute molten metal inside the core catcher;
a lower support system comprising:
a horizontal plate embedded in the bottom concrete surface of the of the reactor shaft
supporting elements disposed on the horizontal plate and arranged radially with respect to the central vertical axis of the reactor shaft, the supporting elements also having oral holes, and
clamps inserted through the oval holes in the core catcher supporting elements and the oval holes in the lower support system supporting elements;
wherein the core catcher supporting elements are connected to the supporting elements of the lower support system by means of the clamps and the oval holes in the core catcher supporting elements and the oval holes of the lower support system supporting elements permit movement of the clamps therein, providing radial movement of the core catcher supporting elements relative to the lower support system supporting elements, the movement absorbing mechanical shock from inflow of molten core into the core catcher.

2. The reactor molten core localization device of claim 1, wherein the plate is a one-piece plate.

3. The reactor molten core localization device of claim 1, wherein the plate is a partitioned plate.

4. The reactor molten core localization device of claim 1, wherein the plate is a sectional plate.

* * * * *